United States Patent [19]
Hartman et al.

[11] 4,032,769
[45] June 28, 1977

[54] PHOTOFLASH LAMP ARRAY WITH WEB HINGE

[75] Inventors: Donald W. Hartman; Donald E. Armstrong; Emery G. Audesse, all of Williamsport, Pa.

[73] Assignee: GTE Sylvania Incorporated, Montoursville, Pa.

[22] Filed: Aug. 21, 1975

[21] Appl. No.: 606,388

[52] U.S. Cl. .................................. 240/1.3; 240/103 R
[51] Int. Cl.² ..................... G03B 15/02; F21V 7/00
[58] Field of Search .......... 240/1.3, 103 R; 431/93, 431/95 R, 95 A

[56] References Cited
UNITED STATES PATENTS

| | | | |
|---|---|---|---|
| 3,598,984 | 8/1971 | Slomski | 240/1.3 |
| 3,598,985 | 8/1971 | Harnden, Jr. et al. | 240/1.3 |
| 3,614,412 | 10/1971 | Bellows | 240/1.3 |
| 3,725,693 | 4/1973 | Anderson et al. | 240/1.3 |
| 3,774,020 | 11/1973 | Heeman et al. | 240/1.3 |
| 3,857,667 | 12/1974 | Vetere et al. | 431/95 |

Primary Examiner—George H. Miller, Jr.
Attorney, Agent, or Firm—Edward J. Coleman

[57] ABSTRACT

A multilamp photoflash array with lamp-reflector units in linear rows facing in opposite directions and nested back-to-back. The rows of reflectors for both sides of the array are vacuum-formed from a single sheet web between the reflector rows for providing a spring-hinged center support. Each reflector has a parabolic surface with an elongated cylindrical recess behind its associated tubular lamp whereby an air space is provided between the reflector and lamp which functions as a thermal insulator for minimizing heat distortion of adjacent reflectors upon flashing of the lamp.

16 Claims, 8 Drawing Figures

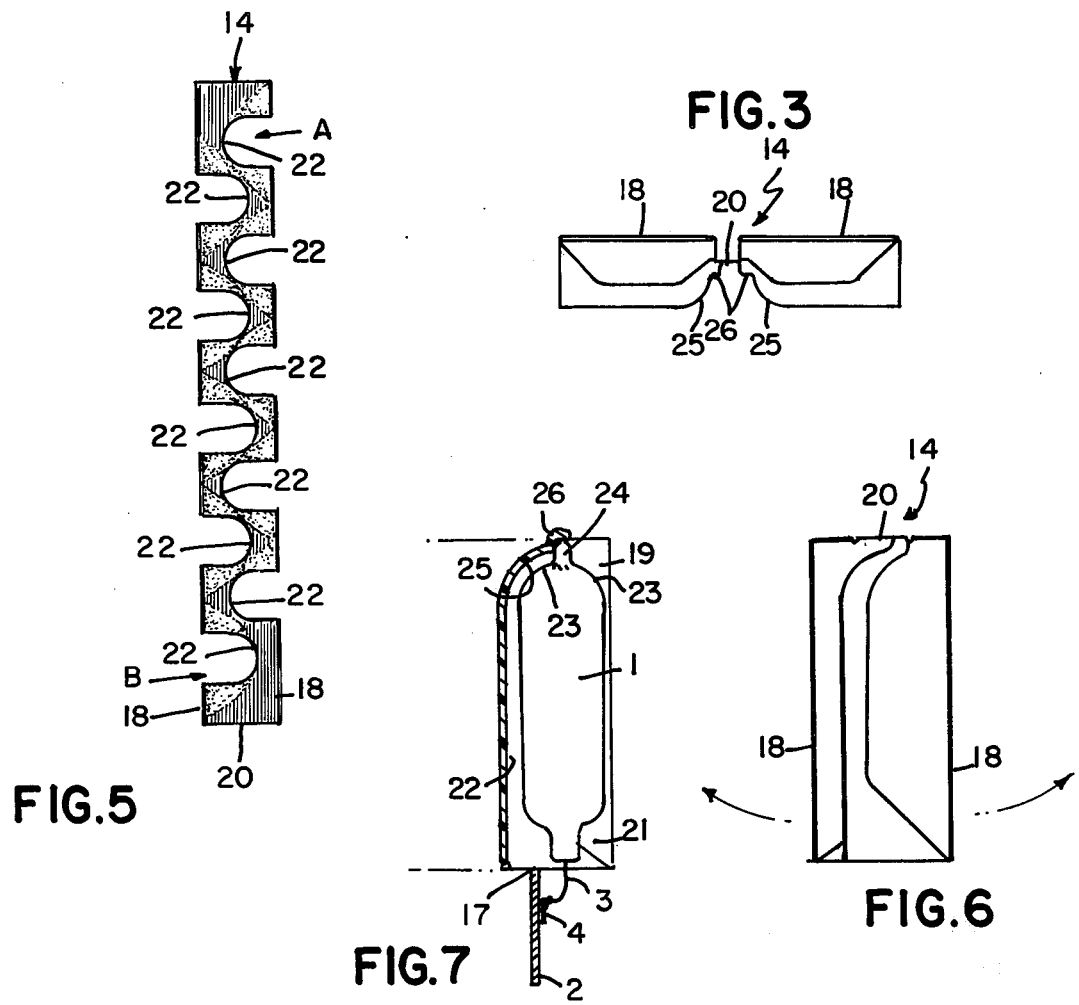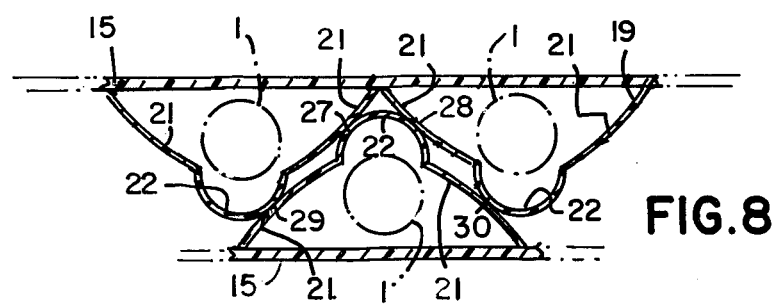

PHOTOFLASH LAMP ARRAY WITH WEB HINGE

BACKGROUND OF THE INVENTION

This invention relates to multiple photoflash lamp devices and, more particularly, to an improved reflector system for linear arrays of photoflash lamps.

Multiple photoflash lamp arrays with lamp-reflector units in linear rows facing in opposite directions are well known in the art as disclosed, for example, in U.S. Pat. Nos. 3,598,984, Slomski, and 3,725,693, Anderson et al. The lamp-reflector units in such linear photoflash lamp arrays are generally arranged in two parallel rows with the lamp and reflectors of one row staggered relative to the lamps and reflectors of the other row, and with the reflectors of one row preferably nested back to back with the reflectors of the other row in order to provide a compact package. In the more general description of Slomski, each row of reflectors preferably is formed of a separate strip of material with an insulation means between the rows of reflectors to minimize distortion of adjacent reflectors upon flashing of a lamp. The insulation means can comprise a sheet of suitable material, such as asbestos, or it can comprise a thermal barrier such as an air space.

The Anderson et al. patent is directed to the mechanical details of the nested reflector arrangement; it describes a pair of plastic molding reflector panels (e.g. injection molded panels) arranged in nested back-to-back relation, and stand-off shoulder means, (e.g. pins and sockets or ribs) located on the back sides of the reflector panels and interfitting or abutting one another to locate the two opposed reflector panels in a predetermined back-to-back relation with their nested reflectors spaced a predetermined distance apart. This structure forms a relatively rigid system that is quite heat resistant to the photoflash lamps which radiate a considerable amount of heat during flashing. The design of the system is good, but injection molded parts are expensive, subject to warpage and breakage through shipping, and require a considerable amount of individual handling to achieve a finished assembly.

Other prior art multiple flash products, such as the flashcube described in U.S. Pat. No. 3,358,131, have used vacuum-formed reflector strips made from relatively thin film (e.g., 7.5 mil) plastics which have been aluminized. This system lends itself to automatic fabrication of many reflectors from sheets of clean material, thereby eliminating a significant portion of the individual handling and costs associated with injection molded parts. Further the thin vacuum-formed reflectors result in a significant weight reduction in the plastic material used, as the average wall thickness of the injection molded reflector strip is about 20 mils. When the thin-walled, vacuum-formed reflector strips were tested in the aforementioned two-sided linear arrays, however, it was found that some type of heat shield was required between the nested strips to prevent heat distortion of adjacent reflectors from the hot flashed lamps. It was also noted that the thin reflector strips could shift within the flash array package and thereby misalign the position and shape of the reflectors.

SUMMARY OF THE INVENTION

Accordingly, it is an object of the present invention to provide an improved multiple reflector system for a photoflash lamp array.

Another object of the invention is to provide a two-sided linear photoflash lamp array having a compact, lightweight and relatively inexpensive multiple reflector system which is positionally stable.

Still another object of the invention is to provide a multiple reflector system for two-sided linear photoflash lamp array which is a novel and relatively inexpensive and lightweight construction and the light-reflecting performance of which is not adversely affected by the flashing of the lamps in the array.

Yet another object of the invention is to provide a multiple reflector system for linear photoflash lamp arrays which is easy and inexpensive to fabricate and which possesses superior handling convenience for ease of assembly into the finished array.

These and other objects, advantages and features are attained, in accordance with the invention, by providing a multiple reflector system for a photoflash lamp array which comprises a pair of complementary strip-like thin-walled reflector panels, each having a row of side-by-side cavities in its front side formed with reflecting surfaces defining individual lamp reflectors, and a channeled web joining the reflector panels and providing a spring-hinged support therefore. Preferably, the reflector panels and channeled web are constituted of a single piece of material with the cavities and channel vacuum-formed therein. In accordance with a further aspect of the invention, each of the reflector cavities is formed with a parabolic reflecting surface having a centrally disposed elongated cylindrical recess extending substantially the entire height of the reflector cavity.

In a two-sided linear photoflash lamp array having an elongated base with two parallel rows of photoflash lamps mounted thereon in a staggered relation, the multiple reflector system is positioned between the rows of lamps with the joined reflector panels folded back-to-back about the channeled web and aligned with the reflector cavities facing outwardly in opposite directions and located in staggered nested relation, the individual reflectors of each row accommodating a respective one of the lamps. A cover with light-transmitting side walls encloses the assembly, and the aligned position and shape of the reflectors are retained with substantial rigidity within the cover by virtue of the hinge bending force of the channeled web, which tends to spring the reflector panels outwardly against the cover sidewalls. Each lamp of the array is substantially tubular and is mounted with its longitudinal axis substantially parallel to the longitudinal axis of the cylindrical recess in its associated reflector, the recess being behind the lamp and providing a predetermined air space between the lamp and reflector which functions as a thermal insulator for minimizing heat distortion of adjacent thermal insulator for minimizing heat distortion of adjacent reflectors of the opposite panel.

BRIEF DESCRIPTION OF THE DRAWINGS

This invention will be more fully described hereinafter in conjunction with the accompanying drawings, in which:

FIG. 3 is an end view of the reflector system of FIG. 2;

FIG. 5 is a bottom view of the folded reflector system;

FIG. 6 is an end view of the folded reflector system;

FIG. 7 is a vertical section of one of the reflector cavities, showing the respective positions of the lamp and printed circuit board; and FIG. 8 is a simplified horizontal section through a fragmentary portion of the assembled array, with the lamps shown in phantom.

DESCRIPTION OF PREFERRED EMBODIMENT

Figure 1:
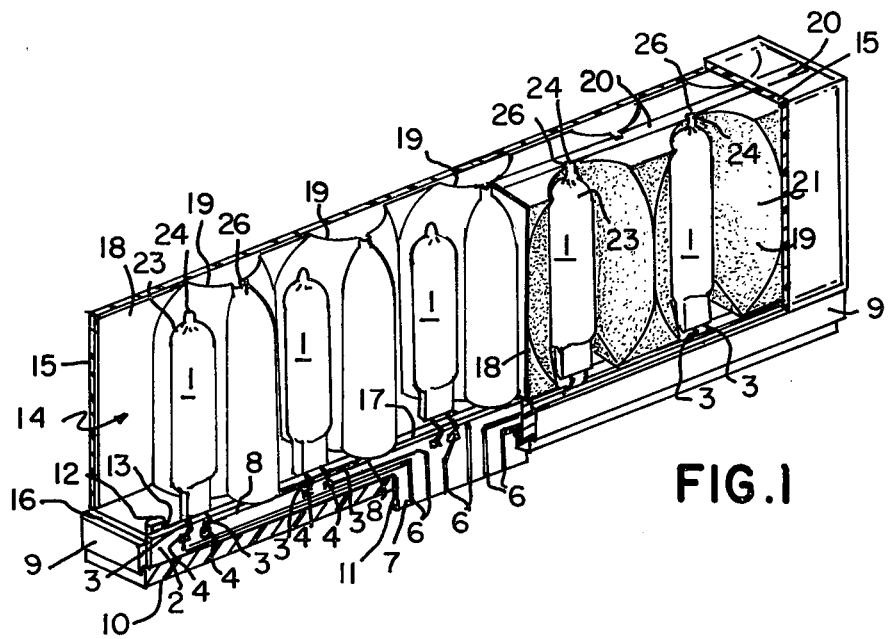
FIG. 1 is a perspective view on an enlarged scale of a two-sided linear photoflash lamp array comprising the invention and shown partly broken away in section to more clearly illustrate the construction thereof.

In the specific embodiment illustrated in FIG. 1, the photoflash array comprises an assembly of 10 lamps 1 arranged in two parallel staggered rows of five lamps each mounted respectively on each side of a printed circuit board 2. Each lamp has a pair of spaced lead-in wires 3 secured, e.g., by soldering or welding, in electrical connection with an adjacent pair of lamp contact areas or pads 4 on the circuit board 2. The photoflash lamps 1 are tubular and baseless and, as well known in the art, comprise an hermetically sealed tubular glass envelope containing an ignition filament and filled with a filamentary combustible material, such as shredded foil of zirconium or hafnium, which ignites and produces a flash of high intensity light when an electric current is supplid to the ignition filament through the wire leads 3.

As decribed in the previously referenced patents, the printed circuit board 2 may comprise a thin metallic sheet substrate, such as steel, having on both its flat surfaces a coating of an insulating material, such as a porcelain enamel or glass or some other vitreous material, on which is deposited, on each side of the board 2, a printed circuit conductive pattern made of, for example, silver and glass paste. The conductive pattern on each side of the board 2 includes a plurality of terminal contact areas 6 located on a depending tab portion 7 on the board 2 centrally located along the longitudinal edge thereof opposite the edge of the board from which the lamps 1 upstand. The terminal contacts 6 are in the form of elongated strips that extend parallel to one another and perpendicularly to the edge of the tab 7, and they are selectively interconnected by suitably shaped conductive traces 8 with a plurality of lamp contact areas or pads 4, which are generally aligned adjacent the opposing edge of the board 2, there being two contact pads for each of the lamps 1. It will be noted that for a row of five lamps 1 there are six of the terminal contacts 6, one for each of the lamps and one that is common to all of the lamps. Accordingly, tab portion 7 is adapted for insertion into an edge connector assembly for operative interconnection with a selective energizing circuit.

The printed circuit board 2 is mounted in an upright position within an elongated base 9, which may comprise a single piece molded from a suitable plastic material, such as polystyrene. The base member 9 may be of trough-shaped form, with the printed circuit board 2 received within the hollow interior of the base and resting on the bottom wall 10 thereof, and with the contact tab portion 7 of the circuit board extending down through a centrally located longitudinal throughslot 11 in the bottom wall 10 of the base so as to project from the underside thereof to expose the lamp terminal contacts 6 thereat. The printed circuit board 2 is suitably supported in an upright position within the base 9 by a pair of support posts 12 (a portion of one is shown) projecting upwardly from the bottom wall 10 of the base member and located on opposite sides of the through-slot 11. Each post 12 has a longitudinally extending slot 13 aligned with the through-slot 11, and the opposite ends of the rigid circuit board are fitted into these slots 13.

In addition to the lamps 1 mounted on the printed circuit board 2 and base 9, the array also comprises a multiple reflector system 14, of a type according to the invention, and a rectangular box-shaped light-transmitting cover 15 of a suitable transparent plastic, such as polystyrene, for enclosing the assembly of flashlamps, reflectors and printed circuit board. The reflector system 14 is inserted down between the two rows of lamps 1 and may rest on the shouldered upper rim 16 of the base 9 and the top edge 17 of the printed circuit board 2. The cover 15 is positioned down over the assembled lamps 1 and reflector system 14 and encases the four sides of the base 9 around the shouldered upper rim portion 16 thereof. The cover 15 may be ultrasonically welded or otherwise suitably fastened to the base 9 to provide a unitary construction for the array that can be plugged into a camera or flash accessory as a unit and then removed and thrown away when all of the lamps have been flashed.

In accordance with the invention, the reflector system 14 is comprised of a pair of complementary strip-like thin-walled reflector panels 18, each having a row of side-by-side lamp-receiving cavities (five in the particular case illustrated) in its front side formed with reflecting surfaces defining individual lamp reflectors 19 for receiving respective ones of the lamps 1 therein, as shown in FIG. 1. The reflector system further includes a channeled web 20 joining the top edges of the reflector panels 18 and providing a spring-hinged center support therefor. Preferably, the reflector panels and channeled web are constituted of a single piece of plastic material, such as cellulose propionate having a maximum wall thickness of about 15 mils, with the channel 20 and cavities 19 vacuum-formed therein. The reflector cavities 19 are provided with suitable specular reflector surfaces, for example, by applying thereonto a coating of aluminum or other suitable reflecting material by conventional vacuum deposition methods.

In the array assembly, the joined reflector panels 18 are folded back to back about the channeled web 20 and aligned with the reflector cavities 19 of the panels facing outwardly in opposite directions and located in staggered nested relation, with the individual reflectors 19 of each row accommodating therein a respective one of the lamps 1 in the corresponding row thereof.

Figure 2:
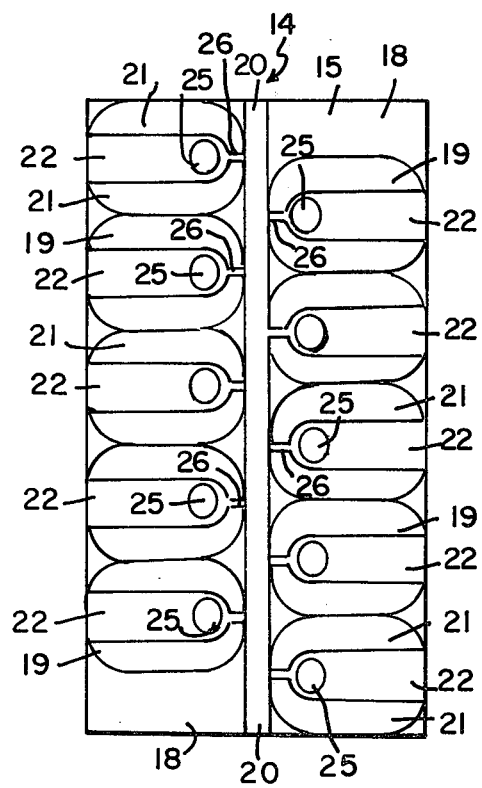
FIG. 2 is a face view of a multiple reflector system according to the invention prior to being folded back to back for assembly into the array of FIG. 1.
Figure 4:
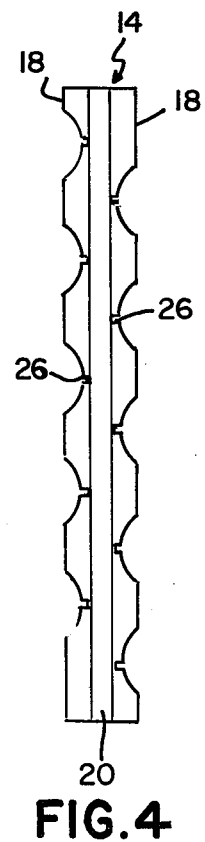
FIG. 4 is a top view of the folded reflector system.

FIGS. 2 and 3 illustrate face and end views, respectivel, of the vacuum-formed reflector system prior to being folded back to back for assembly in the array. FIGS. 4, 5 and 6 show top, bottom and end views of the folded reflector system 14. As illustrated by FIGS. 3 and 6, the forming of a channel in web 20 results in a substantial thinning of the material therealong; e.g. if the reflector system is formed in a plastic sheet having a nominal wall thickness of about 15 mils, the material along the web 20 may be reduced to about 7 mils. In this manner, the folding of the reflector panels is facilitated whereby a self-hinging means is provided having a bending force tending to spring the panels 18 outwardly, as indicated by the arrows in FIG. 6. Hence, when during assembly the reflector system is tucked into the cover 15, this hinged bending force of the channeled web 20 tends to spring the panels 18 outwardly against the light-transmitting sidewalls of cover 15 whereby the aligned position and shape of the reflectors are retained with substantial rigidity within the cover.

In accordance with a further aspect of the invention, each of the reflector cavities 19 is formed with a parabolic reflecting surface 21 having a centrally disposed elongated cylindrical recess 22 extending substantially the entire height of the reflector cavity. As illustrated by FIG. 1 and particularly by FIGS. 7 and 8, each of the tubular lamps 1 is mounted in the assembled array with the longitudinal axis of the lamp substantially parallel to the longitudinal axis of the cylindrical recess 22 in its associated reflector 19. In this manner, the recess 22 behind the lamp 1 provides a predetermined air space between the lamp and reflector along substantially the entire tubular length of the lamp. More specifically, referring to FIGS. 1 and 7, each of the lamps 1 has a constriction defining a shoulder 23 terminating in an exhaust tip 24 at the upper end thereof. In complement thereto, each of the reflector cavities 19 further includes first and second dimples 25 and 26, formed therein at the top of the cylindrical recess 22. As best shown in FIG. 7, dimple 25 provides clearance for shoulder 23 of the lamp envelope, and dimple 26 engages the exhaust tip 24 so as to hold the rearward position of the upper portion of the lamp 1 in its reflector and thereby maintain the predetermined air space between the lamp and reflector. As further shown in FIG. 7, the position and spacing at the bottom portion of the lamp is maintained by the supporting lead-in wires 3 attached to the printed circuit board 2.

In the nested back to back alignment of the reflector system within cover 15, each of the reflector cavities (except for one at each end, viz., the reflectors denoted as A and B in FIG. 5) has four points of contact between its back surface and the back surfaces of reflectors of the opposite panel. More specifically, as illustrated by the fragmentary horizontal section of FIG. 8, two of the points of contact 27 and 28 occur between the cylindrical recess 22 and adjacent parabolic surfaces 21, and the other two points of contact 29 and 30 occur, one on each side of recess 22, between the parabolic surface 21 and adjacent cylindrical recesses 22.

Accordingly, whereas prior art multiple reflector systems countered heat distortion problems by employing an insulating material between reflectors or by using stand-off shoulder means to space the backs of the reflectors a predetermined distance apart, the present lamp array and reflector system provides a predetermined air space between the lamp and reflector (by virtue of the recess 22, including dimple 25) which functions as a thermal insulator therebetween for minimizing heat distortion of adjacent reflectors of the opposite panel upon flashing of a lamp. In addition, the four contact points 27-30 (FIG. 8) and the spring-hinged support of the channeled web 20 within the cover 15 cooperate toward maintaining the structural integrity and positional stability of the reflector system, while at the same time minimizing contact (and thus providing air spaces) between reflector panels 18 to further contribute toward minimizing heat distortion from a flash lamp. Thus, referring to FIG. 8, if the lamp 1 at the bottom of the FIGURE is flashed, the spacing provided behind that lamp by recess 22 minimizes heat distortion of the two reflectors 19 shown at the top of the FIGURE. In one specific embodiment exemplifying of this arrangement, an air gap of about 0.040 inch between the lamp and reflector, for substantially the full length of the lamp, resulted in a sufficiently heat resistant structure, with only minimal losses in reflectance due to the recessed portions in the back of the reflector cavities. Viewing a horizontal section of the reflector, such as one of the cavities 19 of FIG. 8, other parameters of this specific embodiment were as follows. The width and height of the reflector opening at the aperture plane were about 0.75 inch and 1.02 inch respectively; the focal length of the parabolic portion of the reflector was about 0.119 inch; the outside diameter of lamp 1 (including lacquer coating) was about 0.280 inch; the depth of the parabolic curvature was 0.295 inch; the cylindrical recess 22 had a radius of 0.160 inch and provided a total reflector depth of 0.335 inch. The reflector system was formed of a sheet of cellulose propionate which had been aluminized after vacuum forming and had a maximum wall thickness of 15 mils.

Although the invention has been described with respect to a specific embodiment, it will be appreciated that modifications and changes may be made by those skilled in the art without departing from the true spirit and scope of the invention.

What we claim is:

1. A multiple reflector system for a photo-flash lamp array comprising a pair of complementary strip-like thin-walled reflector panels each having a row of side-by-side cavities in its front side formed with reflecting surfaces defining individual lamp reflectors, and a channeled web joining said reflector panels and having two substantially parallel fold lines extending the length of said web, said channeled web providing a spring-hinged support for said reflector panels.

2. The reflector system of claim 1 wherein said pair of reflector panels and said channeled web are constituted of a single piece of material.

3. The reflector system of claim 2 wherein said channeled web and the reflector cavities of said panels are vacuum-formed in said piece of material.

4. The reflector system of claim 3 wherein said piece of material has a maximum wall thickness of about 15 mils.

5. The reflector system of claim 4 wherein said piece of material is cellulose propionate which has been aluminized after vacuum forming.

6. The reflector system of claim 3 wherein each of said reflector cavities is formed with a parabolic reflecting surface having a centrally disposed elongated cylindrical recess extending substantially the entire height of the reflector cavity.

7. The reflector system of claim 1 wherein each of said reflector cavities is formed with a parabolic reflecting surface having a centrally disposed elongated cylindrical recess extending substantially the entire height of the reflector cavity.

8. The reflector system of claim 1 further including a cover having light-transmitting sidewalls, and wherein said joined reflector panels are folded back to back about said channeled web and retained in aligned relation within said cover with the reflector cavities of said panels facing outwardly in opposite directions and located in staggered nested relation, the hinge bending force of said web tending to spring said panels outwardly against said cover sidewalls whereby the aligned position and shape of said reflectors are retained with substantial rigidity.

9. The reflector system of claim 8 wherein each of said reflector cavities is formed with a parabolic reflecting surface having a centrally disposed elongated cylindrical recess extending substantially the entire height of the reflector cavity.

10. The reflector system of claim 9 wherein each of said reflector cavities in said nested back-to-back alignment, except for one reflector at each end, has four points of contact between its back surface and the back surfaces of reflectors of the opposite panel, two of said points of contact occuring between said cylindrical recess and adjacent parabolic surfaces, and the other two points of contact occuring, one on each side of said recess, between said parabolic surface and adjacent cylindrical recesses.

11. The reflector system of claim 9 wherein said pair of reflector panels and said channeled web are constituted of a single piece of material, said channeled web and the reflector cavities of said panels are vacuum-formed in said piece of material, and said piece of material has a maximum wall thickness of about 15 mils, with said material being substantially thinner along the channel in said web to facilitate the folding of said reflector panels back to back whereby a self-hinging means is provided having a bending force tending to spring said panels outwardly.

12. A photoflash lamp array comprising, in combination: an elongated base member; electrical connection means mounted on said base member; two parallel rows of photoflash lamps mounted on said base member and electrically connected to said electrical connection means with the lamps of one row staggered relative to the lamps of the other row; a multiple reflector system positioned between said rows of photoflash lamps and comprised of a pair of complementary strip-like thin-walled reflector panels each having a row of side-by-side lamp-receiving cavities in its front side formed with reflecting surfaces defining individual lamp reflectors, and a channeled web joining the top edges of said reflector and having two substantially parallel fold lines extending the length of said web, said channeled web providing a spring-hinged center support for said reflector panels, said joined reflector panels being folded back to back about said channeled web and aligned with the reflector cavities of said panels facing outwardly in opposite directions and located in staggered nested relation, the individual reflectors of each row accommodating therein a respective one of the lamps in the corresponding row thereof; and a cover having light-transmitting sidewalls supported on said base and enclosing said reflector system and lamps, the channeled web of said reflector system having a hinge bending force tending to spring said panels outwardly against said cover side walls whereby the aligned position and shape of said reflectors are retained with substantial rigidity within said cover.

13. The lamp array of claim 12 wherein each of said reflector cavities is formed with a parabolic reflecting surface having a centrally disposed elongated cylindrical recess extending substantially the entire height of the reflector cavity, and each of said lamps is substantially tubular and mounted with the longitudinal axis of the lamp substantially parallel to the longitudinal axis of the cylindrical recess in its associated reflector and with said recess behind the lamp providing a predetermined air space between the lamp and reflector substantially the entire tubular length of said lamp.

14. The lamp array of claim 13 wherein each of said lamps has a constriction defining a shoulder terminating in an exhaust tip at the upper end thereof, and each of said reflector cavities further includes first and second dimples formed therein at the top of said cylindrical recess, said first dimple providing clearance for said shoulder, and said second dimple engaging said exhaust tip and thereby holding the rearward position of the upper portion of the lamp in its reflector whereby said predetermined air space between the lamp and reflector is maintained.

15. The lamp array of claim 13 wherein each of said reflector cavities in said nested back-to-back alignment, except for one reflector at each end, has four points of contact between its back surface and the back surfaces of reflectors of the opposite panel, two of said points of contact occuring between the cylindrical recess and adjacent parabolic surfaces, and the other two points of contact occuring, one on each side of said recess, between said parabolic surface and adjacent cylindrical recesses.

16. The lamp array of claim 13 wherein said pair of reflector panels and said channeled web are constituted of a single piece of material, said channeled web and the reflector cavities of said panels are vacuum-formed in said piece of material, and said piece of material has a maximum wall thickness of about 15 mils, with said material being substantially thinner along the channel in said web to facilitate the folding of said reflector panels back to back whereby a self-hinging means is provided having a bending force tending to spring said panels outwardly.

* * * * *

UNITED STATES PATENT AND TRADEMARK OFFICE
CERTIFICATE OF CORRECTION

PATENT NO. : 4,032,769

DATED : JUNE 28, 1977

INVENTOR(S) : DONALD W. HARTMAN, DONALD E. ARMSTRONG
EMERY G. AUDESSE

It is certified that error appears in the above-identified patent and that said Letters Patent are hereby corrected as shown below:

[57] In the Abstract:

Line 4 after "sheet" add (-of relatively thick material having a channeled-)

Signed and Sealed this

Twentieth Day of September 1977

[SEAL]

Attest:

RUTH C. MASON
Attesting Officer

LUTRELLE F. PARKER
Acting Commissioner of Patents and Trademarks